No. 724,898. PATENTED APR. 7, 1903.
E. J. LITTLE, G. H. BREYMANN & D. C. SHAW.
GARBAGE FURNACE OR CREMATORY.
APPLICATION FILED NOV. 10, 1900.
NO MODEL. 2 SHEETS—SHEET 2.
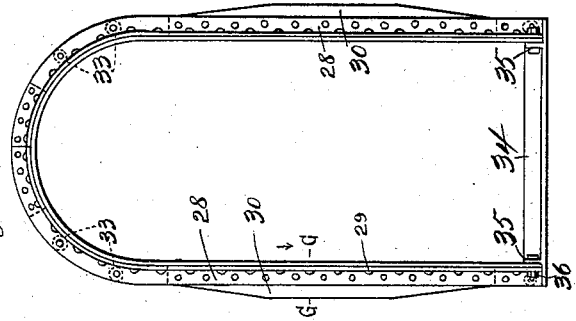
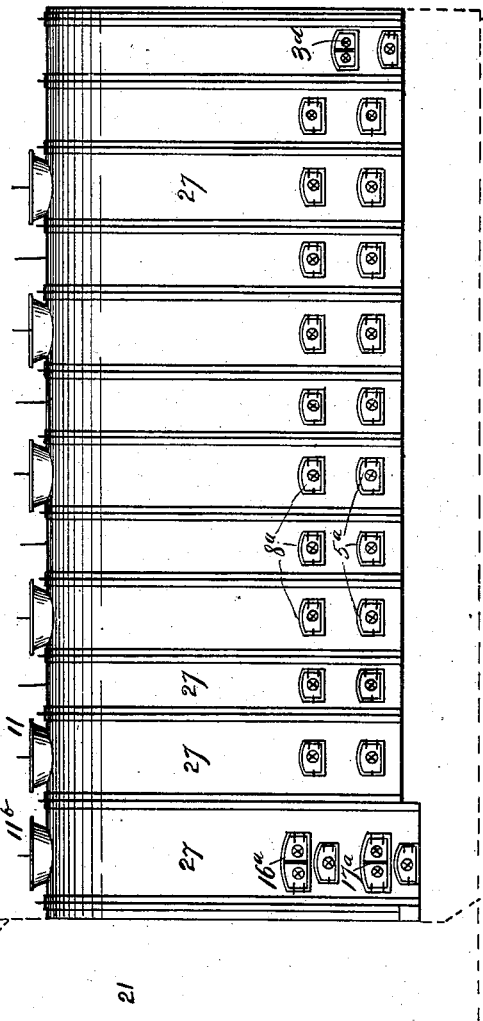
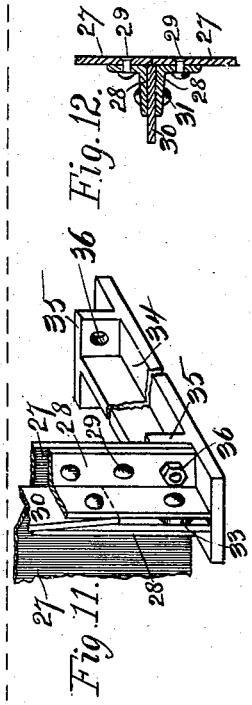
WITNESSES: INVENTORS

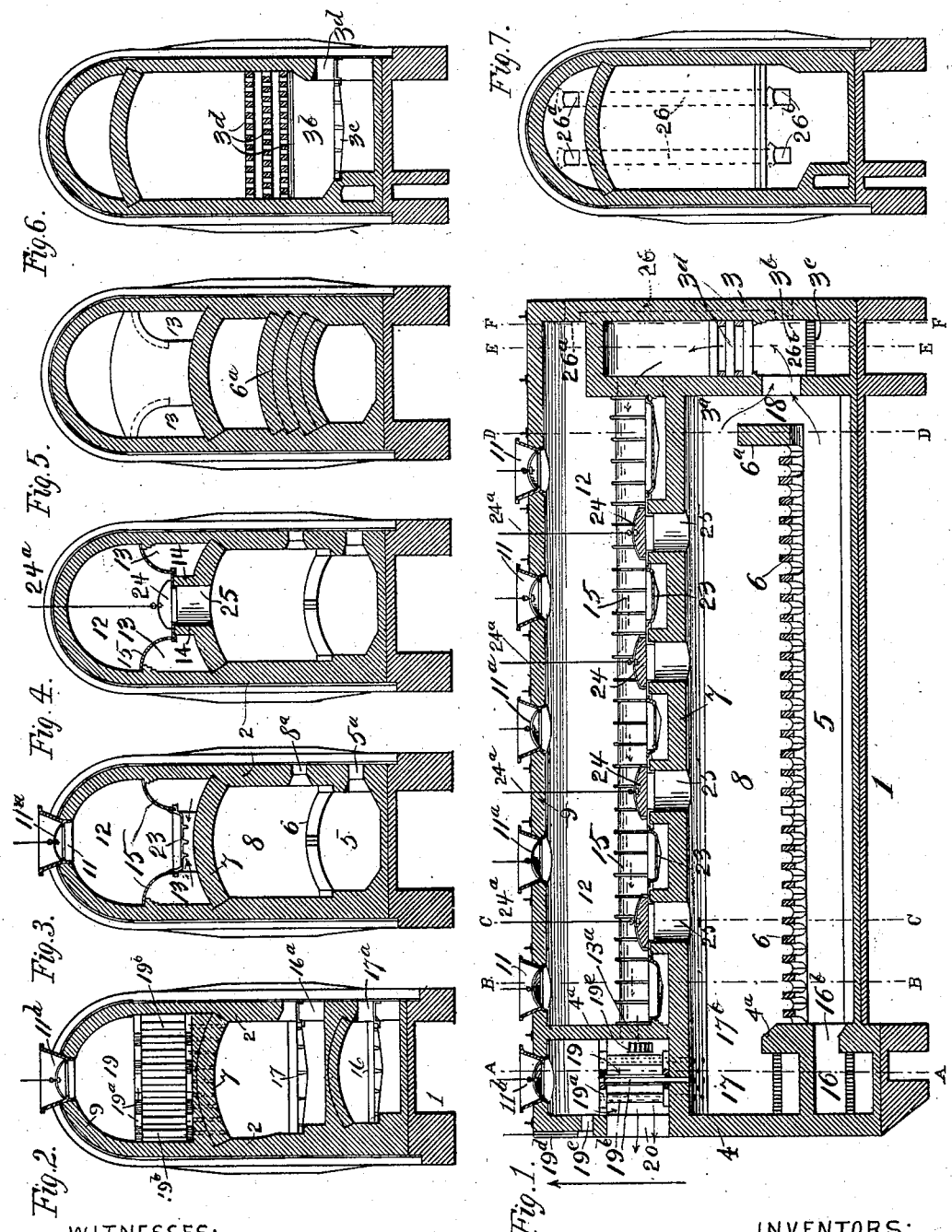

UNITED STATES PATENT OFFICE.

EUGENE J. LITTLE, GEORGE H. BREYMANN, AND DANIEL C. SHAW, OF TOLEDO, OHIO.

GARBAGE FURNACE OR CREMATORY.

SPECIFICATION forming part of Letters Patent No. 724,898, dated April 7, 1903.

Application filed November 10, 1900. Serial No. 36,011. (No model.)

*To all whom it may concern:*

Be it known that we, EUGENE J. LITTLE, GEORGE H. BREYMANN, and DANIEL C. SHAW, citizens of the United States, residing at Toledo, in the county of Lucas and State of Ohio, have invented certain new and useful Improvements in Garbage Furnaces or Crematories; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to that class of incinerating-furnaces which is employed for the reduction of garbage, refuse, dead animals, night-soil, and the like; and its object is provide a simple, compact, and efficient means for the complete and economical combustion of such substances and for the deodorization of the gases and products of combustion in such manner that the receiving, the storing, the drying, and the burning of the garbage shall be entirely sanitary.

The further objects of our invention are to provide means for drying the garbage to be burned, so that the garbage will itself serve as fuel for its own evaporation and reduction, for the rapid evaporation of water and other fluids, and for feeding to the furnace at such points and in such quantities as may be desired the dried or partly-dried substances to be consumed.

Our crematory is also designed to utilize the main furnace-fires as a means for evaporating the fluids of the garbage to be consumed and for treating the vapors from such fluids in such manner as to further vaporize, convert, and consume said vapors and to free them from stench.

Our device is designed to provide a maximum of capacity with a minimum of ground or floor space occupied. To this end the principal chambers and passages of our furnace are placed one above another, resulting in a narrow elongated structure. The walls of this structure are of fire-brick. The side walls sustain the lateral thrust of the various arches.

The further object of our invention is to provide, in connection with the device here indicated, a metal shell or jacket for the walls of our crematory, having a system of external braces and stays, by means of which the whole structure is rendered extremely rigid and durable, dispensing with internal stay-rods, which soon burn away, and which will permit renewals and repairs of burned-out portions without disturbing the remainder of the structure.

The crematory hereinafter described relates to that class of crematories shown and described in our pending application for a patent, filed June 15, 1899, Serial No. 720,613, and is designed as an improvement thereon.

We attain the objects above referred to by means of the construction and arrangement of parts hereinafter described, and shown and illustrated in the accompanying drawings, in which—

Figure 1 is a vertical central longitudinal sectional elevation of our crematory; Fig. 2, a transverse section of the same on line A A, Fig. 1; Fig. 3, the same on line B B; Fig. 4, the same on line C C; Fig. 5, the same on line D D; Fig. 6, the same on line E E; Fig. 7, the same on line F F; Fig. 8, a side elevation of the same; Fig. 9, an enlarged transverse sectional elevation of the sheet-metal shell for our furnace; Fig. 10, a top plan view of a portion of the same; Fig. 11, a perspective view of a portion of said shell, showing in detail the arrangement of the metal sheets, the buckstays, and the bottom cross-braces hereinafter referred to; and Fig. 12, an enlarged horizontal section on line G G, Fig. 9.

Like numerals of reference indicate like parts throughout the drawings.

In the drawings, 1 is the base or bed of the furnace; 2 2, the elongated vertical side walls thereof; 3, the front end wall, and 4 the rear end wall. Above the bed or base 1 is a longitudinal flue or passage 5. Above the passage 5 are transversely disposed the bars of the grate 6. Above this grate is the arched roof 7 of the main combustion-furnace, which arch springs from and is supported upon the side walls, as illustrated in Figs. 2 to 5, inclusive. The space between the grate 6 and the arch 7 constitutes the main longitudinal combustion-chamber 8. 9 is the top arch, of fire-brick, springing from and extending between the two side walls, as illustrated in the transverse sectional drawings, there being a considerable distance between the two arches 7 and 9. Above the arch 9 is the upper floor of our crematory, so arranged that carts and wagons may, if desired, be driven thereon and having therein a series of openings 11, which extend through the arch 9, which openings are provided with trap-doors $11^a$. These trap-doors are arranged at convenient intervals along the length of the furnace and are designed to permit the introduction of garbage, &c., into the chamber 12, just beneath the arch 9, which chamber constitutes a receiving, evaporating, and drying chamber.

Above the arch 7 and supported thereby are two flues 13, one at either side of the furnace and running the length thereof. These flues have for their bottom the arch 7, for their outer sides the side walls 2, for their inner sides upright walls 14, and for their top the short arches or inclined walls 15, supported by the side walls and the uprights 14 and forming part of the floor or bottom of the chamber 12.

$4^a$ is a cross-wall near the end wall 4, and between these two walls are furnaces 16 and 17, one above the other, which are fed through furnace-door $16^a$ and $17^a$ in the side wall. From the fire-box of the furnace 16 leads an aperture $16^b$ into passage 5 beneath the grate-bars. From the fire-box of the furnace 17 leads an aperture $17^b$ into the chamber 8 above the grate-bars 6. It will be seen that the flame and hot gases from the furnace 16 pass beneath the grate-bars and that from the furnace 17 they pass above the grate-bars longitudinally the length of the furnace. At the opposite end of the grate 6 the two passages 5 and 8 unite behind a bridge-wall $6^a$ in a common passage 18, which leads upwardly between the end wall 3 and the adjacent cross-wall $3^a$ into the open ends of the flues 13, which at their front end are open and connected directly with the passage 18.

In the space between the end wall 3 and the cross-wall $3^a$ is a supplemental furnace $3^b$, having grate-bars $3^c$, located a short distance below the point where the passage 18 leads through the cross-wall $3^a$. Directly above this opening is a series of stench-bars $3^d$, disposed in the path of the flames from the three furnaces 16, 17, and $3^b$. These stench-bars are of fire-clay or fire-brick or other refractory material. The furnace $3^b$ is provided with stoking-doors and ash-doors $3^e$.

Inclosed by end wall 4, cross-wall $4^a$, arch 7, and arch 9 is a chamber 19, into which lead the two flues 13 through openings $13^a$ in the cross-wall. In the chamber 19 is a horizontal partition $19^a$. In the space between this partition and the arch 7 are a series of vertical fire-clay pipes or tubes $19^b$, open at both ends, and at bottom passing through the arch 7 above the furnace 17 and at top passing through the partition $19^a$. In the top of the chamber 19 is a trap-door $11^b$, through which access is obtained to the interior of the chamber and through which renewals and repairs of the pipes or tubes $19^b$ may be made. Leading through the wall 4 from the top compartment of the chamber 19 is an opening $19^c$, in which is a damper $19^d$. When this damper is closed, the upper compartment of the chamber 19 is a space through which there is no circulation. When the damper is open, flame from furnace 17 will pass through the tubes, by which means the tubes are readily cleaned. From the lower compartment of the chamber 19 leads an opening, flue, or conduit 20 into the stack or chimney 21.

Between the two flues 13 13 is a floor for the drying-chamber 12, consisting of plates 23, formed, preferably, of cast-iron and shaped as shallow pans or basins. These pans are elevated above the top of the arch 7. The flues 13 at opposite sides of the pans have openings which lead into the space beneath the pans, as illustrated in Fig. 3. By this means the heated gases and products of combustion circulate between the flues from side to side and beneath the pans. A series of openings 25 communicates between the drying-chamber 12 and the combustion-chamber 8. These openings are closed by means of trap-doors or covers 24. Chains or rods $24^a$, connected with the trap-doors 24 and leading up through the top arch 9, afford convenient means for raising the trap-doors and lowering them into place. The openings 11 into the drying-chamber are directly above the plates or pans 23, and the openings 25 from the drying-champer into the combustion-chamber 8 alternate with the pans 23 and are midway between the openings 11.

In the end wall 3 are flues or passages 26, which at top open into the drying-chamber 12, as at $26^a$, and which at bottom open into the furnace $3^b$, as at $26^b$.

In the side walls are doors $5^a$ and $8^a$ on a level with the passages or chambers 5 and 8, respectively, by means of which these chambers are accessible whenever necessary.

The side walls and top of our crematory are inclosed in a sheet-metal casing, preferably sheet-steel. This casing is made up of arched sections 27, which are preferably built up of overlapping plates riveted together, as in boiler construction, and which will be understood without further illustration. Through these various sections are openings for the doors hereinbefore referred to. The sections 27 meet edge to edge and are secured together by means of two L-shaped angle-bars 28, one branch of each of the angle-bars being riveted to the plates 27, as at 29. The other branches of the angle-bars which are thus arranged in pairs have just sufficient space between them to receive edgewise a stiffening-plate 30. The pairs of angle-bars and the stiffening-plate are rigidly secured together by rivets passing through the three members, as at 31. The stiffening-plates 30 extend from near the bottom of the shell to near the point from which springs the top arch. The angle-bars 28 are in two pieces and extend from the bottom of the side walls to the center of the top arch, where they meet. (See Figs. 9 and 10.) Between the outwardly-projecting flanges of these two angle-bars at their meeting-point is fitted a plate 32, which overlaps the ends of both angle-bars, and the meeting ends of the angle-bars and the plate 32 are securely riveted together, as illustrated in Figs. 9 and 10. Those portions of the outwardly-projecting flanges of the angle-bars which are not secured to the plates 30 and 32 are held in proper relation to each other by means of interposed washers 33, a rivet passing through both flanges and the washer.

34 34 are a series of bottom cross-braces inverted-T shape in cross-section and resting upon the foundation-walls of the structure. For each pair of sections 27 there is a cross-brace 34, the braces being disposed at the joints formed by the meeting sections and the angle-bars. Each cross-brace is provided near each extremity on its upper side with an upwardly-projecting cross-web 35, beyond which the longitudinal web of the plate does not extend. Thus there is formed at each end of the cross-brace a plain flat plate, upon which the ends of the pairs of angle-bars rest. The lower ends of the angle-bars and the sections 27 are secured to the cross-webs 35 by means of bolts and nuts, as at 36.

It will be seen that by the construction here described the metal arch is solidly mounted and secured and prevented from spreading at bottom by means of the metal brace-plate 34. It will also be seen that by means of the angle-bars 34 and the interposed brace-plates 30 powerful buckstays are formed, which will prevent the brickwork of the side walls of the furnace from yielding to the lateral thrust of the arches and grates supported thereon.

The operation of our device is as follows: The material to be burned is thrown through doors 11 into the chamber 12, the water and fluids settling into the pans 23. Fires are built in the furnaces 16, 17, and $3^b$. The flame and hot gases from the furnaces 16 and 17 pass both over and under the bars 6, meeting in the passage 18, thence passing into and through the supplemental furnace $3^b$, thence through the series of stench-bars $3^d$. The flame and gases now divide and pass through the flues 13 into the chamber 19 and thence out through aperture 20 into the smoke-stack. The walls of the flues become very hot and the garbage resting thereon soon becomes dry and fit for fuel. The gases which circulate between the flues beneath the pans cause the fluids which have settled into the pans to be rapidly evaporated. As the vapors of evaporation ascend they are drawn into the openings $26^a$, down through the flues or passages 26, and out into the furnace at $26^b$. Here the vapors from the chamber 12 join the flame and gases from the furnaces 16 and 17 and are carried along the flues and out through the smoke-stack. The stench-bars $3^d$ are maintained at a white heat by the furnace $3^b$, and the vapors, gases, and fumes which pass through the stench-bars are converted and deodorized.

The vertical pipes or tubes 19, which are connected with and removably supported on the arch 7, are exposed to the intense heat of the furnace 17 and reach a high temperature, so that when the gases and products of combustion are discharged from the two flues 13 into the chamber 19 they are again reheated and further converted and deodorized and pass into the stack. At this point air may be admitted through door $19^e$ to aid combustion.

Unless the garbage contains an excess of fluids the stoking of the furnaces 16 and 17 may after the furnace becomes thoroughly heated be discontinued, as the garbage will evaporate and dry so rapidly as to furnish fuel for its own incineration. The dry garbage is fed into the combustion-chamber 8 through the openings 25, the lids 24 being raised for this purpose. The greater part of the heaps of garbage deposited directly beneath the trap-doors 11 will by reason of their slope and gravity fall through the openings 25. The remainder of the garbage in the heaps may be fed into the furnace 8, and the pans may be cleaned out by means of forks passed down through the top openings.

The garbage-furnace here described is designed more particularly for use in large establishments, and by reason of its compact and regular form is found to be well adapted for construction and use in groups or batteries. In smaller crematories for the two furnaces 16 17 may be substituted a single furnace disposed in such fashion that its divided flame will traverse both the chambers 5 and 8.

Having described our invention, what we claim, and desire to secure by Letters Patent, is—

1. A garbage-furnace comprising an elongated chamber formed by side walls, end walls and a top and bottom, an elongated grating in said chamber, an arch above the grating whereby there are formed within the inclosing walls two passages, to wit, the bottom one beneath the grating, the middle one beneath the grating and said arch, and a receiving and drying chamber between said arch and the top, a furnace connected with said bottom passage at its inlet, a furnace connected with said middle passage at its inlet, return-flues in said receiving and drying chamber leading to the stack, a passage connecting the outlet ends of said bottom and middle passages with the inlet ends of said return-flues, a supplemental or reheating furnace in said connecting-passage, stench-bars above said latter furnace, and flues leading from the upper chamber into said supplemental furnace and beneath the stench-bars.

2. In a garbage-furnace, three horizontal parallel chambers disposed one above the other, means for heating the lower two at their inlet ends, return-flues in the upper chamber, a connecting-passage between the return-flues and the outlet ends of said two lower chambers, a supplemental or reheating furnace in said connecting-passage, and flues leading from said upper chamber and discharging into said supplemental or reheating furnace.

3. In a garbage-furnace, a receiving and drying chamber, a combustion-chamber beneath said receiving and drying chamber, flues leading through the receiving and drying chamber and connected with a stack, a supplemental or reheating furnace intermediate the combustion-chamber and said flues and in the path of the gases from the combustion-chamber, a series of stench-bars above said latter furnace, and flues leading from the receiving and drying chamber into said latter furnace and beneath the stench-bars.

4. In a garbage-furnace, an elongated receiving and drying chamber, a furnace, flues in said chamber to conduct the products of combustion from the furnace to a stack, a series of transverse connections between said flues, and a series of evaporating-pans forming covers for said transverse connections.

5. In a garbage-furnace, a combustion-chamber, a furnace therefor, an arch above the furnace, a chamber above the furnace and having for its floor said arch, a series of pipes or tubes of refractory material disposed in said chamber and connected with said arch, whereby said pipes or tubes are heated by the furnace through the arch, and means for conveying the products of combustion from said furnace into and through said chamber and among said pipes or tubes.

6. In a garbage-furnace, three parallel horizontal passages disposed in the same vertical plane, a furnace at the inlet end of said two lower chambers, return-flues in the upper chamber, a passage leading from the two lower chambers into said return-flues, a supplemental or reheating furnace in said passage, a series of stench-bars in said passage above said supplemental or reheating furnace, and stench-tubes at the outlet end of said flues, said latter stench-tubes being disposed immediately above said first-mentioned furnace.

7. In a garbage-furnace, an elongated chamber formed by side walls, end walls, a top and a bottom, a metal casing for the sides and top comprising a series of rectangular elongated sheets of metal disposed transversely of the furnace, a pair of angle-bars at the adjacent edges of each pair of sheets, a vertical brace-plate disposed edgewise between the adjacent faces of the angle-bars, and means for securing said sheets, angle-bars and brace-plates in fixed relation to each other.

In testimony whereof we affix our signatures in presence of two witnesses.

EUGENE J. LITTLE.
  GEO. H. BREYMANN.
  DANIEL C. SHAW.

Witnesses:
 F. M. DOTSON,
 L. BROWN.